United States Patent
Beck et al.

(10) Patent No.: US 9,331,798 B2
(45) Date of Patent: May 3, 2016

(54) SYSTEM AND METHOD FOR MOBILE LOCATION BY PROXIMITY DETECTION

(75) Inventors: Andrew Beck, Ashburn, VA (US); Thomas B. Gravely, Herndon, VA (US)

(73) Assignee: CommScope Technologies LLC, Hickory, NC (US)

( * ) Notice: Subject to any disclaimer, the term of this patent is extended or adjusted under 35 U.S.C. 154(b) by 365 days.

(21) Appl. No.: 12/986,439

(22) Filed: Jan. 7, 2011

(65) Prior Publication Data

US 2011/0171912 A1    Jul. 14, 2011

Related U.S. Application Data

(60) Provisional application No. 61/293,502, filed on Jan. 8, 2010.

(51) Int. Cl.
| | | |
|---|---|---|
| *G01S 5/02* | (2010.01) | |
| *H04B 17/26* | (2015.01) | |
| *H04B 17/27* | (2015.01) | |
| *H04B 17/309* | (2015.01) | |
| *H04B 17/364* | (2015.01) | |
| *H04B 17/327* | (2015.01) | |
| *H04B 17/345* | (2015.01) | |

(52) U.S. Cl.
CPC .......... *H04B 17/309* (2015.01); *G01S 5/0221* (2013.01); *H04B 17/26* (2015.01); *H04B 17/27* (2015.01); *H04B 17/327* (2015.01); *H04B 17/345* (2015.01); *H04B 17/364* (2015.01)

(58) Field of Classification Search
CPC .......... G01S 5/0221; G01S 5/06; G01S 5/14; H04B 17/27

USPC ......... 340/572.1–572.9, 686.6; 342/463–465, 342/450

See application file for complete search history.

(56) References Cited

U.S. PATENT DOCUMENTS

| | | |
|---|---|---|
| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |

(Continued)

FOREIGN PATENT DOCUMENTS

JP    06-347529    12/1994

OTHER PUBLICATIONS

Metric, Merriam-Webster Dictionary, http://www.merriam-webster.com/dictionary/metric, accessed Dec. 2012.*

(Continued)

*Primary Examiner* — Gregory C Issing
*Assistant Examiner* — Fred H Mull
(74) *Attorney, Agent, or Firm* — Fogg & Powers LLC (57) ABSTRACT

A system and method for determining the location of a mobile device in a communications network having one or more proximity sensors. A request to locate the mobile device may be received and at least one of the proximity sensors tasked to receive a signal transmission from the mobile device. One or more signal characteristics of the signal transmission from the mobile device may be measured by each tasked proximity sensor, and a location of the mobile device determined as a function of the measured characteristics. This may be accomplished by associating a fixed location with each tasked proximity sensor, and then determining the location of the mobile device as a function of one of the associated fixed locations.

20 Claims, 9 Drawing Sheets

(56) References Cited

U.S. PATENT DOCUMENTS

| | | | |
|---|---|---|---|
| 4,891,650 A | 1/1990 | Sheffer | |
| 5,056,106 A | 10/1991 | Wang | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |
| 5,372,144 A | 12/1994 | Mortier et al. | |
| 5,404,376 A | 4/1995 | Dent | |
| 5,423,067 A | 6/1995 | Manabe | |
| 5,465,289 A | 11/1995 | Kennedy | |
| 5,506,863 A | 4/1996 | Meidan et al. | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,559,864 A | 9/1996 | Kennedy | |
| 5,592,180 A | 1/1997 | Yokev et al. | |
| 5,608,410 A | 3/1997 | Stilp et al. | |
| 5,614,914 A | 3/1997 | Bolgiano et al. | |
| 5,675,344 A | 10/1997 | Tong et al. | |
| 5,736,964 A | 4/1998 | Ghosh et al. | |
| 5,815,538 A | 9/1998 | Grell et al. | |
| 5,825,887 A | 10/1998 | Lennen | |
| 5,870,029 A | 2/1999 | Otto et al. | |
| 5,920,278 A | 7/1999 | Tyler et al. | |
| 5,952,969 A | 9/1999 | Hagerman et al. | |
| 5,959,580 A | 9/1999 | Maloney et al. | |
| 5,960,341 A | 9/1999 | LeBlanc et al. | |
| 5,973,643 A | 10/1999 | Hawkes et al. | |
| 5,987,329 A * | 11/1999 | Yost | H04W 64/00 342/357.31 |
| 6,014,102 A | 1/2000 | Mitzlaff et al. | |
| 6,047,192 A | 4/2000 | Maloney | |
| 6,091,362 A | 7/2000 | Stilp | |
| 6,097,336 A | 8/2000 | Stilp | |
| 6,097,709 A | 8/2000 | Kuwabara | |
| 6,097,959 A | 8/2000 | Yost | |
| 6,101,178 A | 8/2000 | Beal | |
| 6,108,555 A | 8/2000 | Maloney et al. | |
| 6,108,558 A | 8/2000 | Vanderspool, II | |
| 6,115,599 A | 9/2000 | Stilp | |
| 6,115,605 A | 9/2000 | Siccardo et al. | |
| 6,119,013 A | 9/2000 | Maloney et al. | |
| 6,127,975 A | 10/2000 | Maloney | |
| 6,144,711 A | 11/2000 | Raleigh et al. | |
| 6,172,644 B1 | 1/2001 | Stilp | |
| 6,184,829 B1 | 2/2001 | Stilp | |
| 6,188,351 B1 | 2/2001 | Bloebaum | |
| 6,191,738 B1 | 2/2001 | Pfeil et al. | |
| 6,201,499 B1 | 3/2001 | Hawkes et al. | |
| 6,201,803 B1 | 3/2001 | Munday et al. | |
| 6,212,319 B1 | 4/2001 | Cayrefourcq | |
| 6,233,459 B1 | 5/2001 | Sullivan et al. | |
| 6,246,884 B1 | 6/2001 | Karmi et al. | |
| 6,266,013 B1 | 7/2001 | Stilp et al. | |
| 6,269,246 B1 | 7/2001 | Rao et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,295,455 B1 | 9/2001 | Fischer et al. | |
| 6,311,043 B1 | 10/2001 | Haardt et al. | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,347,228 B1 * | 2/2002 | Ludden et al. | 455/456.5 |
| 6,351,235 B1 | 2/2002 | Stilp | |
| 6,366,241 B2 | 4/2002 | Pack | |
| 6,388,618 B1 | 5/2002 | Stilp et al. | |
| 6,393,294 B1 | 5/2002 | Perez-Breva et al. | |
| 6,400,320 B1 | 6/2002 | Stilp et al. | |
| 6,407,703 B1 | 6/2002 | Minter et al. | |
| 6,421,009 B2 * | 7/2002 | Suprunov | 342/465 |
| 6,449,486 B1 | 9/2002 | Rao | |
| 6,463,290 B1 | 10/2002 | Stilp et al. | |
| 6,470,195 B1 | 10/2002 | Meyer | |
| 6,477,161 B1 | 11/2002 | Hudson | |
| 6,483,460 B2 | 11/2002 | Stilp et al. | |
| 6,492,944 B1 | 12/2002 | Stilp | |
| 6,501,955 B1 | 12/2002 | Durrant et al. | |
| 6,519,465 B2 | 2/2003 | Stilp et al. | |
| 6,546,256 B1 | 4/2003 | Maloney | |
| 6,553,322 B1 | 4/2003 | Ignagni | |
| 6,563,460 B2 | 5/2003 | Stilp et al. | |
| 6,571,082 B1 | 5/2003 | Rahman | |
| 6,591,112 B1 | 7/2003 | Siccardo et al. | |
| 6,603,428 B2 | 8/2003 | Stilp | |
| 6,603,761 B1 | 8/2003 | Wang | |
| 6,640,106 B2 | 10/2003 | Gutowski et al. | |
| 6,646,604 B2 | 11/2003 | Anderson | |
| 6,661,379 B2 | 12/2003 | Stilp et al. | |
| 6,677,895 B1 * | 1/2004 | Holt | 342/465 |
| 6,765,531 B2 | 7/2004 | Anderson | |
| 6,771,625 B1 | 8/2004 | Beal | |
| 6,771,969 B1 | 8/2004 | Chinoy | |
| 6,782,264 B2 | 8/2004 | Anderson | |
| 6,782,265 B2 | 8/2004 | Perez-Breva et al. | |
| 6,834,234 B2 | 12/2004 | Scherzinger et al. | |
| 6,839,539 B2 | 1/2005 | Durrant et al. | |
| 6,845,240 B2 * | 1/2005 | Carlson | G01S 5/0081 342/387 |
| 6,859,172 B2 | 2/2005 | Powers et al. | |
| 6,871,077 B2 | 3/2005 | Kennedy, Jr. | |
| 6,873,290 B2 | 3/2005 | Anderson et al. | |
| 6,876,859 B2 | 4/2005 | Anderson et al. | |
| 6,920,329 B2 | 7/2005 | Kennedy, Jr. et al. | |
| 6,922,170 B2 | 7/2005 | Alexander, Jr. | |
| 6,944,465 B2 | 9/2005 | Spain et al. | |
| 6,944,542 B1 * | 9/2005 | Eschenbach | G01C 21/165 701/472 |
| 6,952,158 B2 | 10/2005 | Kennedy, Jr. | |
| 6,987,979 B2 | 1/2006 | Carlsson | |
| 6,996,392 B2 | 2/2006 | Anderson et al. | |
| 7,023,383 B2 | 4/2006 | Stilp et al. | |
| 7,116,987 B2 | 10/2006 | Spain, Jr. et al. | |
| 7,167,713 B2 | 1/2007 | Anderson | |
| 7,167,714 B2 | 1/2007 | Dressler et al. | |
| 7,233,799 B2 | 6/2007 | Spain, Jr. | |
| 7,250,907 B2 | 7/2007 | Krumm et al. | |
| 7,257,414 B2 | 8/2007 | Spain, Jr. et al. | |
| 7,271,765 B2 | 9/2007 | Stilp et al. | |
| 7,323,991 B1 * | 1/2008 | Eckert et al. | 340/572.1 |
| 7,340,259 B2 | 3/2008 | Maloney et al. | |
| 7,383,051 B2 | 6/2008 | Spain, Jr. et al. | |
| 7,427,952 B2 | 9/2008 | Bull et al. | |
| 7,433,652 B2 | 10/2008 | Durgin | |
| 7,433,695 B2 | 10/2008 | Gordon et al. | |
| 7,440,762 B2 | 10/2008 | Maloney et al. | |
| 7,460,505 B2 | 12/2008 | Spain | |
| 7,593,738 B2 | 9/2009 | Anderson | |
| 7,725,111 B2 | 5/2010 | Dressler et al. | |
| 7,734,298 B2 | 6/2010 | Bhattacharya et al. | |
| 7,753,278 B2 | 7/2010 | Spain, Jr. et al. | |
| 7,796,966 B2 | 9/2010 | Bhattacharya et al. | |
| 7,848,762 B2 | 12/2010 | Gordon et al. | |
| 7,899,467 B2 | 3/2011 | Feuerstein et al. | |
| 8,013,785 B2 | 9/2011 | Bhattacharya et al. | |
| 8,068,802 B2 | 11/2011 | Bhattacharya et al. | |
| 8,068,855 B2 | 11/2011 | Dressler et al. | |
| 8,106,817 B2 | 1/2012 | Bhattacharya et al. | |
| 8,106,818 B2 | 1/2012 | Bhattacharya et al. | |
| 8,155,394 B2 | 4/2012 | Allegra et al. | |
| 2002/0172223 A1 | 11/2002 | Stilp et al. | |
| 2003/0064734 A1 | 4/2003 | Stilp et al. | |
| 2003/0139188 A1 | 7/2003 | Chen et al. | |
| 2003/0164796 A1 * | 9/2003 | Needham | G01S 19/48 342/357.46 |
| 2003/0190919 A1 | 10/2003 | Niemenmaa | |
| 2003/0203738 A1 | 10/2003 | Brown et al. | |
| 2003/0211827 A1 * | 11/2003 | Yonezawa | H04B 7/15507 455/7 |
| 2004/0043775 A1 | 3/2004 | Kennedy, Jr. et al. | |
| 2004/0132466 A1 | 7/2004 | Kennedy, Jr. et al. | |

(56) References Cited

U.S. PATENT DOCUMENTS

| | | | |
|---|---|---|---|
| 2004/0203539 | A1 | 10/2004 | Benes et al. |
| 2004/0203921 | A1 | 10/2004 | Bromhead et al. |
| 2004/0218664 | A1 | 11/2004 | Kennedy, Jr. et al. |
| 2004/0252752 | A1 | 12/2004 | Kennedy, Jr. et al. |
| 2005/0058182 | A1 | 3/2005 | Kennedy, Jr. et al. |
| 2005/0136945 | A1 | 6/2005 | Kennedy, Jr. et al. |
| 2005/0164712 | A1 | 7/2005 | Kennedy, Jr. et al. |
| 2005/0192026 | A1* | 9/2005 | Carlson ............ G01S 5/06 455/456.1 |
| 2006/0003695 | A1* | 1/2006 | Kennedy et al. ......... 455/456.1 |
| 2006/0003775 | A1 | 1/2006 | Bull et al. |
| 2006/0030333 | A1 | 2/2006 | Ward et al. |
| 2006/0116130 | A1 | 6/2006 | Kennedy, Jr. et al. |
| 2006/0125695 | A1 | 6/2006 | Kennedy, Jr. et al. |
| 2006/0141998 | A1* | 6/2006 | Kennedy et al. ............ 455/423 |
| 2006/0154607 | A1 | 7/2006 | Kennedy, Jr. et al. |
| 2006/0221864 | A1* | 10/2006 | Niu et al. ................. 370/255 |
| 2006/0240836 | A1 | 10/2006 | Kennedy, Jr. et al. |
| 2007/0087689 | A1* | 4/2007 | Alles et al. ................ 455/11.1 |
| 2007/0111746 | A1 | 5/2007 | Anderson et al. |
| 2007/0129085 | A1* | 6/2007 | Kennedy, Jr. ............ 455/456.1 |
| 2007/0155401 | A1 | 7/2007 | Ward et al. |
| 2007/0155489 | A1 | 7/2007 | Beckley et al. |
| 2007/0202885 | A1 | 8/2007 | Kennedy, Jr. et al. |
| 2008/0045240 | A1* | 2/2008 | Cole et al. ............... 455/456.1 |
| 2008/0132244 | A1 | 6/2008 | Anderson et al. |
| 2008/0132247 | A1 | 6/2008 | Anderson et al. |
| 2008/0137524 | A1 | 6/2008 | Anderson et al. |
| 2008/0158059 | A1 | 7/2008 | Bull et al. |
| 2008/0160952 | A1 | 7/2008 | Bull et al. |
| 2008/0160953 | A1 | 7/2008 | Mia et al. |
| 2008/0161015 | A1 | 7/2008 | Maloney et al. |
| 2008/0248811 | A1 | 10/2008 | Maloney et al. |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0005061 | A1* | 1/2009 | Ward ..................... G01S 5/021 455/456.1 |
| 2009/0011779 | A1* | 1/2009 | MacNaughtan ...... G01S 5/0252 455/456.6 |
| 2010/0130225 | A1* | 5/2010 | Alles et al. .............. 455/456.1 |
| 2010/0210206 | A1* | 8/2010 | Young ..................... 455/13.4 |
| 2010/0291947 | A1* | 11/2010 | Annamalai ............. 455/456.1 |
| 2011/0043373 | A1* | 2/2011 | Best ...................... G01S 1/68 340/8.1 |

OTHER PUBLICATIONS

P. Khadivi et al., Handoff trigger nodes for hybrid IEEE 802.11 WLAN/cellular networks, First International Conference on Quality of Service in Heterogeneous Wired/Wireless Networks, p. 164-170, Oct. 2004.*

Proximity sensor, Oxford Dictionary of Mechanical Engineering, 2013, Retrieved from http://www.oxfordreference.com/view/10.1093/acref/9780199587438.001.0001/acref-9780199587438-e-4925.*

Femtocell, SearchTelecom.com Definitions, http://searchtelecom.techtarget.com/definition/femtocell,Dec. 2007.*

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1898, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University, Apr. 16-18, 1997, 4 pages.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

(56) References Cited

OTHER PUBLICATIONS

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

\* cited by examiner

SYSTEM AND METHOD FOR MOBILE LOCATION BY PROXIMITY DETECTION

CROSS REFERENCES

The present application is with and claims the priority benefit of the provisional application entitled "Mobile Location by Proximity Detection", Application Ser. No. 61/293, 502, filed on Jan. 8, 2010, the entirety of which is incorporated herein by reference.

The present application is related to and concurrently filed with the application entitled, "Mobile Location by Proximity Detection", application Ser. No. 12/986,452, filed on Jan. 7, 2011, the entirety of which is incorporated herein by reference.

BACKGROUND

Applicant's disclosure is generally directed towards the location of a mobile device within a communications network. There are many traditional methods of locating a mobile device including, but not limited to, handset-based techniques and network-based techniques. These techniques may include, but are not limited to, Assisted-Global Positioning Satellite (A-GPS), Uplink Time Difference of Arrival (U-TDOA), Observed TDOA (O-TDOA), Enhanced Observed Time Difference (E-OTD), Electronic Cell Identification (E-CID), Radio Frequency (RF) fingerprinting, and Multiple Range Estimation Location (MREL) techniques, to name a few. Such techniques, however, may be ineffective in locating mobile devices in certain environments, e.g., urban environments, indoor environments, etc.

Several telecommunications industry reports have indicated a higher usage of mobile devices in such challenging environments as well as higher usage of location based applications in recent years. Mobile devices operating in these environments may be blocked from receiving GPS signals due to the signal attenuation of the satellite signals by building infrastructure and/or other environmental aspects. This same infrastructure may also attenuate the signals transmitted by cellular towers such that cellular service may be unavailable. RF repeaters or a Distributed Antenna System (DAS) may therefore be installed and/or implemented to amplify and distribute the appropriate signals to provide adequate coverage. Repeater/DAS systems, however, introduce signal delay and gain into the respective transmission path thereby resulting in a deleterious effect of decreasing the accuracy of a location system or even preventing a location from being computed or determined.

Therefore, there is a need in the art for a system and method to remove the dependence of location systems upon GPS and/or base station signals and may also remove the effect of signal delay and gain introduced by repeater and/or DAS coverage products upon location determination for a mobile device. There is also a need in the art to detect a mobile device of interest by monitoring the device's signal transmissions and determining the proximity of the mobile device to a sensor performing the monitoring function. This proximity detection function may be performed by an RF sensor, e.g., an independent RF sensor or an RF sensor embedded in an existing network component or apparatus.

In view of these needs, one embodiment of the present subject matter provides a method of determining the location of a mobile device in a communications network having one or more proximity sensors. The method may include receiving a request to locate the mobile device and tasking at least one of the proximity sensors to receive a signal transmission from the mobile device. One or more signal characteristics of the signal transmission from the mobile device may be measured by each tasked proximity sensor. A location of the mobile device may then be determined as a function of the measured characteristics by associating a fixed location with each tasked proximity sensor and determining the location of the mobile device as a function of one of the associated fixed locations.

Another embodiment of the present subject matter provides a method for determining a location of a mobile device in a communications network having a plurality of base station transceivers in communication with the mobile device. The method may include the steps of determining the location of the mobile device without utilizing signals received or transmitted to the base station transceivers by using proximity detection sensors deployed in the network and by determining the location of the mobile device as a function of information provided by ones of the proximity detection sensors.

A further embodiment of the present subject matter may provide a method of determining the location of a mobile device in a communications network having one or more proximity sensors. The method may include receiving a request to locate the mobile device and tasking at least one of the proximity sensors to receive a signal transmission from the mobile device. One or more signal characteristics of the signal transmission from the mobile device may be measured by each tasked proximity sensor. A location of the mobile device may then be determined as a function of the measured characteristic, wherein the measured characteristic includes range information.

An additional embodiment of the present subject matter may provide a method of determining if a mobile device is operating in a predetermined region of a communications network. The method may include receiving a request to locate the mobile device and tasking one or more proximity sensors in the network to receive a signal transmission from the mobile device. One or more signal characteristics of the signal transmission from the mobile device may be measured by the tasked proximity sensor. A fixed location may then be associated with each tasked proximity sensor and the proximity of the mobile device determined in the predetermined region using the associated fixed locations.

Yet another embodiment of the present subject matter provides a method for determining a location of a mobile device operating in a wireless communications network having an A-GPS positioning determining entity (PDE). The method may include receiving a location request for the mobile device and determining if the request is for a region in the network having a proximity detection system. If the region has a proximity detection system, then both the proximity detection system and the A-GPS PDE may be tasked to determine a location of the mobile device. If at least one of the proximity detection system and the A-GPS PDE provide a location result for the mobile device, then the uncertainty of the respective location result may be determined and a location result returned having the lowest uncertainty as the location for the mobile device. If neither the proximity detection system nor the A-GPS provide a location result for the mobile device, then a cell-identification may be utilized as the location for the mobile device. If the region does not have a proximity detection system, then the A-GPS PDE may be tasked to determine a location of the mobile device. If the A-GPS PDE provides a location result for the mobile device, then this location result may be utilized as the location for the mobile device. If the A-GPS does not provide a location result for the mobile device, then a cell-identification may be utilized as the location for the mobile device.

One embodiment of the present subject matter may provide a method for determining a location of a mobile device operating in a wireless communications network having an A-GPS PDE. The method may include receiving a location request for the mobile device and determining the location of the mobile device as a cell identification location if no location results are received from either the A-GPS PDE or a proximity detection system PDE. The location of the mobile device may be determined as a location result from the A-GPS PDE if the A-GPS PDE provides a location result having a lower uncertainty than a location result from the proximity detection system PDE. Further, the location of the mobile device may be determined as a location result from the proximity detection system PDE if the proximity detection system PDE provides a location result having a lower uncertainty than a location result from the A-GPS PDE.

A further embodiment of the present subject matter provides a method for determining a location of a mobile device operating in a wireless communications network. The method may comprise the steps of: receiving a location request for the mobile device and routing the request to a proximity detection system and a serving mobile location center (SMLC). The following steps may then be performed substantially in tandem: (i) tasking both the proximity detection system and the SMLC to determine a location of the mobile device, (ii) if at least one of the proximity detection system and the SMLC provide a location result for the mobile device, then determining the uncertainty of the respective location result and returning the location result having the lowest uncertainty as the location for the mobile device, and (iii) if neither the proximity detection system nor the SMLC provide a location result for the mobile device, then using a cell-identification as the location for the mobile device.

These and other embodiments of the present subject matter will be readily apparent to one skilled in the art to which the disclosure pertains from a perusal or the claims, the appended drawings, and the following detailed description.

DETAILED DESCRIPTION

With reference to the figures where like elements have been given like numerical designations to facilitate an understanding of the present subject matter, the various embodiments of a system and method for mobile location by proximity detection are described.

Embodiments of the present subject may generally determine the location of a mobile device by proximity detection by recognizing the need for a mobile device to be located. This may be accomplished by, for example, a tasking message provided by cellular network equipment monitoring calls (e.g., 911 detection), by scanning receivers located in the proximity of a region of location coverage, by a user of the mobile device itself requesting a location. One or more proximity sensors in the network may then be tasked to receive the mobile transmission of interest and measure transmission signal quality. Measurements may then be compiled from the tasked proximity sensors and the location of the mobile device determined.

Figure 1:
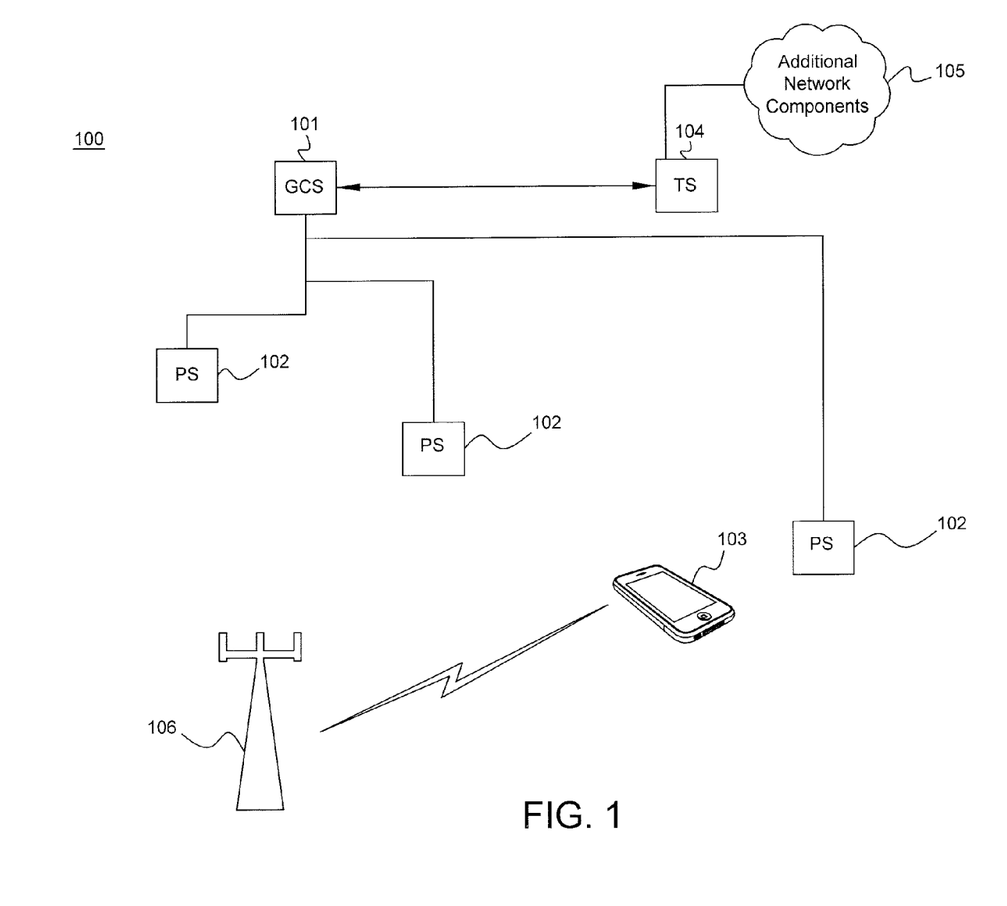
FIG. 1 is a diagram of a basic architecture for an embodiment of the present subject matter.

FIG. 1 is a diagram of a basic architecture for an embodiment of the present subject matter. With reference to FIG. 1, a mobile device 103 of interest may be in communication with a base station 106 in an exemplary communications network 100. A Geolocation Control System (GCS) 101 in the network 100 may receive tasking from a Tasking Server (TS) 104. The TS 104 may be operably connected to other components 105 of the communications network 100. The network 100 may also include one or more Proximity Sensors (PS) 102. These PSs 102 may receive a location request from the GCS 101 and may attempt to detect the mobile device 103 of interest. Any one or each PS 102 may also report the quality of its detection measurements to the GCS 101. The GCS 101 may then utilize these reports to determine a location of the mobile device 103.

In other embodiments of the present subject matter, the TS 104 may be embedded in certain network core components (e.g., Serving Mobile Location Center (SMLC), etc.). The TS 104 may also be embedded within one or more PSs 102 (to receive off-the-air tasking). Alternatively, the TS 104 may be supplied by an independent receiver apparatus, the PS 102 may be embedded in a complementary repeater or Distributed Antenna System (DAS). In additional embodiments, the PS 102 may be provided by one or more apparatuses connected to the repeater or DAS, and/or the PS 102 supplied by an independent, standalone, receiver apparatus.

By way of example, in the embodiment where the PS 102 is embedded in a repeater or DAS, this may be accomplished by adding software to an existing repeater/DAS to support the detection, and/or may be accomplished by adding receiver and/or processing hardware to perform any appropriate proximity detection functions. Further, in the embodiment where the PS 102 is connected to a repeater/DAS system, the PS 102 may also comprise receiver/processor hardware and an inline or passive coupler interface to the repeater/DAS signaling path. Additionally, when the PS 102 is employed as an independent receiver, the PS 102 may include both receiver and processor hardware and/or an antenna interface if none exist.

In certain embodiments, one may embed the PS 102 in a repeater/DAS system for new network installations where the embedded development has been completed and the repeater/DAS system has yet to be deployed. Generally, most repeater/DAS systems deployed today do not have this capability; however, some systems may add this capability by exemplary software and/or hardware upgrade (e.g., the Andrew Solutions node-A repeater). Other existing repeater/DAS systems may be more applicable to an independent PS 102 embodiment, e.g., in cases where no repeater/DAS system exists and proximity detection is desired, an independent receiver apparatus may be more applicable.

An exemplary PS 102 according to an embodiment of the present subject matter may utilize supplied RF signal parameters (e.g., channel number or frequency, timeslot, spreading code, etc.) and may also determine metrics upon received signals thereby, such as, but not limited to, signals transmitted by a mobile device 103 of interest. Exemplary metrics may include, but are not limited to, signal quality information such as received signal strength indication (RSSI), signal to noise ratio (SNR), ratio of energy per bit over power spectral density of noise and interference (Eb/Io), ratio of received pilot energy over power spectral density of noise and interference (Ec/Io), etc. Generally, these metrics may indicate how well the applicable proximity sensor receives transmission from the mobile device. Thus, the closer in proximity the mobile device is to the proximity sensor, the better the RF signal path and thus the better the signal quality metrics.

Exemplary PSs 102 may be utilized in many embodiments of the present subject matter. For example, a PS may be a receiver apparatus may be coupled to an RF coverage antenna port of a repeater or DAS system (as opposed to the donor side), a PS may be a receiver apparatus may be coupled to a DAS or repeater coverage antenna, a PS may be an independent receiver apparatus may include its own antenna (not directly coupled to a repeater or DAS system), and/or the PS may be embedded as an integrated function within an existing repeater or DAS receiver.

In embodiments of the present subject matter employing plural repeaters or DAS coverage antennas (e.g., to supply signal coverage to a large area such as an airport, outdoor canyon roadway, convention center, etc.), multiple proximity sensors may be coupled to multiple ports or antenna connections to localize a mobile device of interest to a desired geographic level of accuracy. In certain embodiments, just detecting that the mobile device is connected to the repeater/DAS system is a suitable level of accuracy; however, knowing the coverage antenna to which the mobile device is connected may provide a suitable level of accuracy. In other embodiments, the utilization of measurements from multiple proximity sensors may provide a greater location accuracy than that of a traditional coverage antenna.

Proximity sensors according to embodiments of the present subject matter may also provide range information as a measurement by exploiting timing relationships of a communications network. By way of example, the proximity sensor may measure the transmit time of a cellular signal emitted from a known base station, repeater or DAS node antenna. This may then be coupled with the receive time measured by the proximity sensor at its location and the transceiver processing delay imposed by the mobile device and wireless network. By subtracting mobile processing delay and repeater/DAS time delays, and knowing the location of the cellular base station and the proximity sensor, the flight time of the signal from the mobile device to the proximity sensor may be determined, which generally represents the range from the proximity sensor to the mobile device. In a further embodiment, transmit time may be obtained directly by signals transmitted from a base station if such timing is embedded or derived from the signal, or from ancillary timing measurement equipment in the network (e.g., Location Measurement Unit). This may relieve a proximity sensor of additional overhead of measuring such signals; however, as in a previous embodiment, mobile device and/or repeater/DAS time delays should be subtracted to determine a true propagation range measurement.

An exemplary GCS 101 according to an embodiment of the present subject matter may utilize one or more proximity sensor measurements to determine a location for the mobile device 103 of interest. In one embodiment, a fixed location (e.g., latitude/longitude/altitude) may be associated with each PS 102. This may be the physical location of the sensor or antenna, the centroid of signal coverage for the sensor or antenna, or a location deemed to be the most probable mobile location given the surroundings of the sensor (e.g., waiting room, convention center, or other predetermined area), or other fixed location. Further embodiments of the present subject matter may also account for the physical boundaries around the sensor that limit possible locations for the mobile device of interest. For example, a subway tunnel provides a restricted linear coverage region, and any location outside of the tunnel would typically be unfeasible.

An exemplary GCS 101 may determine a fixed location to employ by utilizing measurements supplied by the PSs 102. By way of example, the GCS 101 may select the highest quality/strength measurement and provide a fixed location associated with the corresponding PS 102. In another embodiment where two or more PSs 102 returned results above a predetermined threshold, the GCS 101 may utilize the multiple results by, for example, employing a straight average of the fixed locations associated with the PSs 102 above the threshold. Exemplary thresholds may be determined such that they provide a statistical confidence of real signal detection thereby avoiding a false alarm. In another non-limiting example, the GCS 101 may utilize the multiple results by employing a weighted average of the fixed locations associated with the PSs 102 above the threshold with the results having higher strength or quality measurements having a greater weight than the results having lower strength or quality measurements to thereby bias the resultant location determination towards the higher quality measurements.

In embodiments of the present subject matter where range information is provided by the PS 102, the GCS 101 may utilize the same in determining a location of a mobile device 103 of interest. Further, if two or more PSs 102 are reporting measurements above a specified quality metric threshold, range information may be employed to determine a location of a mobile device along a straight line between the sensors. Physical boundaries may also be employed to refine a location of the mobile device along with the range. For example, in the previously described subway tunnel scenario, a range measurement along with the tunnel boundaries may be employed to determine the location of a mobile device. It should be noted that in this example, a range measurement from a single sensor may be utilized to provide a location within the tunnel boundary. RSSI or other signal quality information may also be used to estimate range. For example, through knowledge of the transmit power level of a mobile device (obtained by monitoring downlink transmission or via a network interface) and uplink power measurements, propagation path loss may be determined by a simple calculation. Through utilization of a traditional path loss model, the typical distance associated with the calculated path loss may be determined. This may correspond to a range calculation to thereby aid in refining a location estimate of the mobile device of interest.

In other embodiments, the GCS 101 may also determine a quality metric with each geographic location. This may be utilized by the location recipient or application to judge the approximate accuracy of the computed location of the mobile device 103. Generally, quality metrics are presented as values of confidence and uncertainty and may represent a probability that a location determination is within a certain region. In many geographic location technologies where multiple measurement surfaces are computed (e.g., Time Difference of Arrival (TDOA), Angle of Arrival (AOA), Time of Arrival (TOA), GPS, MREL, etc.), a circular error probability (CEP) may be utilized to represent quality. CEP generally represents a fixed probability or confidence that a location determination lies within a predetermined area. CEP, like quality metrics, may be determined in embodiments of the present subject matter but may also be determined utilizing signal coverage geometry.

Figure 2:
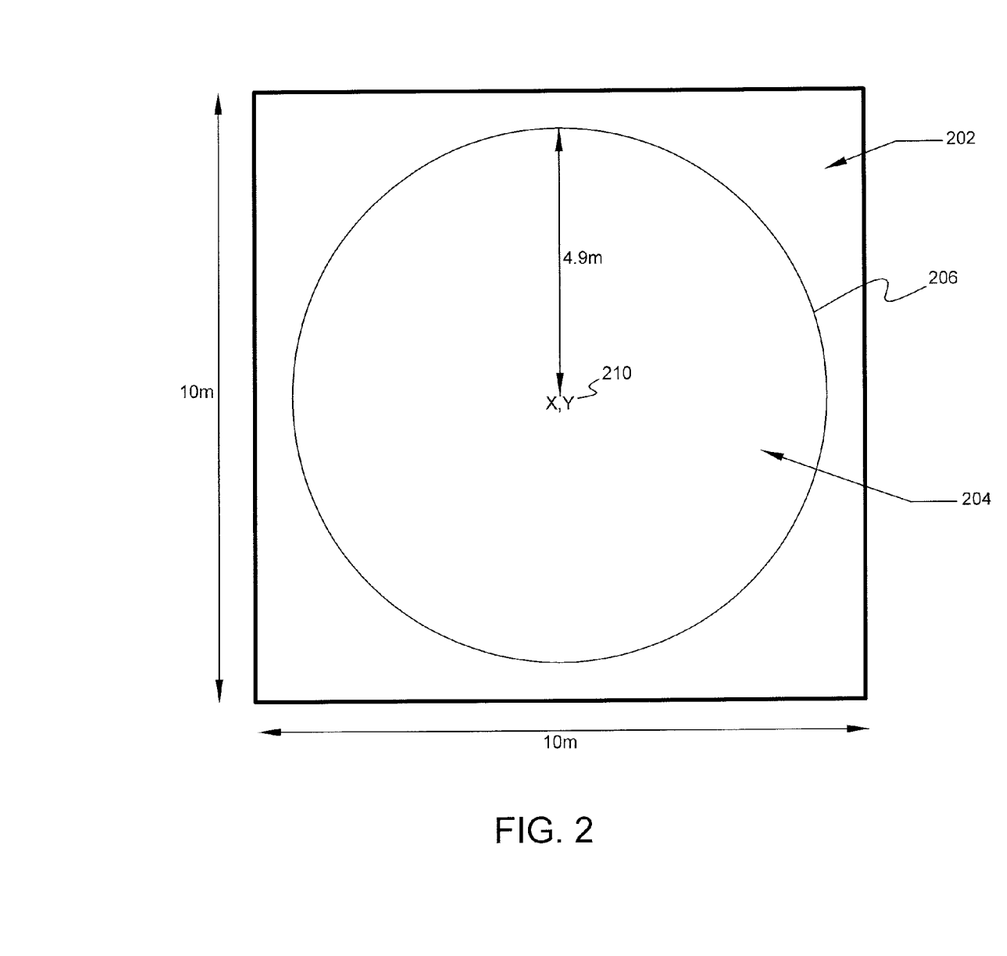
FIG. 2 is a depiction of location uncertainty according to an embodiment of the present subject matter.

FIG. 2 is a depiction of location uncertainty according to an embodiment of the present subject matter. With reference to FIG. 2, a DAS coverage antenna may provide uniform wireless service to a predetermined region 202, such as an office having an area of 100 m$^2$. An exemplary proximity detection system may localize a target mobile device to a respective proximity detection antenna 210 with a 75% confidence and 4.9 m uncertainty region 204 by simple geometry, that is, a 4.9 m radius circle 206 covers 75% of the office region area 202.

An exemplary GCS may also manage one or more proximity sensors or proximity sensor networks. In one embodiment of the present subject matter, one GCS may manage all of the proximity sensors across a predetermined region, such as, but not limited to, a cellular network, a county, state, etc. In another embodiment, an exemplary GCS may manage one proximity sensor and/or may be embedded as a logical function within the proximity sensor apparatus itself. In embodiments where the GCS manages multiple proximity sensors, the GCS may also include knowledge of what cell site IDs act as serving sites for what proximity sensors and/or may task proximity sensors applicable to the cell serving a call of interest. This would minimize network traffic and sensor overhead.

In certain embodiments, an exemplary proximity detection system GCS function may receive tasking from another source to request a location computation. Thus, in one embodiment a scanning receiver may be employed to monitor mobile events and detect those events requiring or desiring a location for a mobile device of interest. Exemplary location logic may include, but is not limited to, the dialed number from a mobile (e.g., 911, 112, etc.), the identity of the mobile (international mobile subscriber identity (IMSI), temporary mobile subscriber identity (TMSI), mobile identification number (MIN), electronic serial number (ESN), international mobile equipment identity (IMEI), etc.), a class mark indicator, an overhead transmission indicator (e.g., emergency call or SMS message) and combinations thereof. Such scanning receivers or other appropriate apparatuses may monitor mobile events at the physical RF layer and/or via a network connection such as, but not limited to, Abis or Lu. Thus, when a target mobile device is detected, a scanning receiver may provide a location tasking request to an exemplary GCS along with any necessary RF signal parameters for location sensor tasking.

In other embodiments, core communications network devices may also be employed to task an exemplary proximity detection system. For example, serving mobile location center (SMLC), stand-alone SMLC (SAS), mobile positioning center (MPC), gateway mobile location center (GMLC), enhanced-SMLC (eSMLC) entities are defined in industry standards and may provide this function. Additional logic may be needed within or appended to these entities to support a proximity detection system according to embodiments of the present subject matter as neither the location center nor the core network may contain knowledge that a mobile device is locatable via an exemplary proximity detection system. The core network may, however, have knowledge that a mobile device is being served by a particular cell tower, and the cell tower may serve a repeater or DAS system as well as other mobile devices in the area that are not connected to a repeater or DAS system. For example, a cell tower near an airport may serve a DAS system with a donor antenna on the roof of the airport. This same cell tower may also serve mobile devices on an access road and in parking lots of the airport that are not served by the DAS system; therefore, to locate a mobile device in this scenario, an exemplary location center may attempt multiple location technologies or techniques. One embodiment of the present subject matter would embed knowledge in the location center of the existence of a proximity detection system and the serving cell site IDs. Thus, when a location request is made to the location center for a call served by a cell containing a proximity detection system, the location center may task multiple location systems to locate the call. The location center may task an A-GPS PDE as well as a proximity detection system PDE. If the mobile device is located outdoors with good receipt of GPS signals, an A-GPS location may be determined and utilized by the location center. If, however, the mobile devices were located indoors and GPS satellite signals are not obtainable, an exemplary proximity detection system location would be employed. Further, location centers may use serial or parallel logic for tasking multiple location systems.

Figure 3:
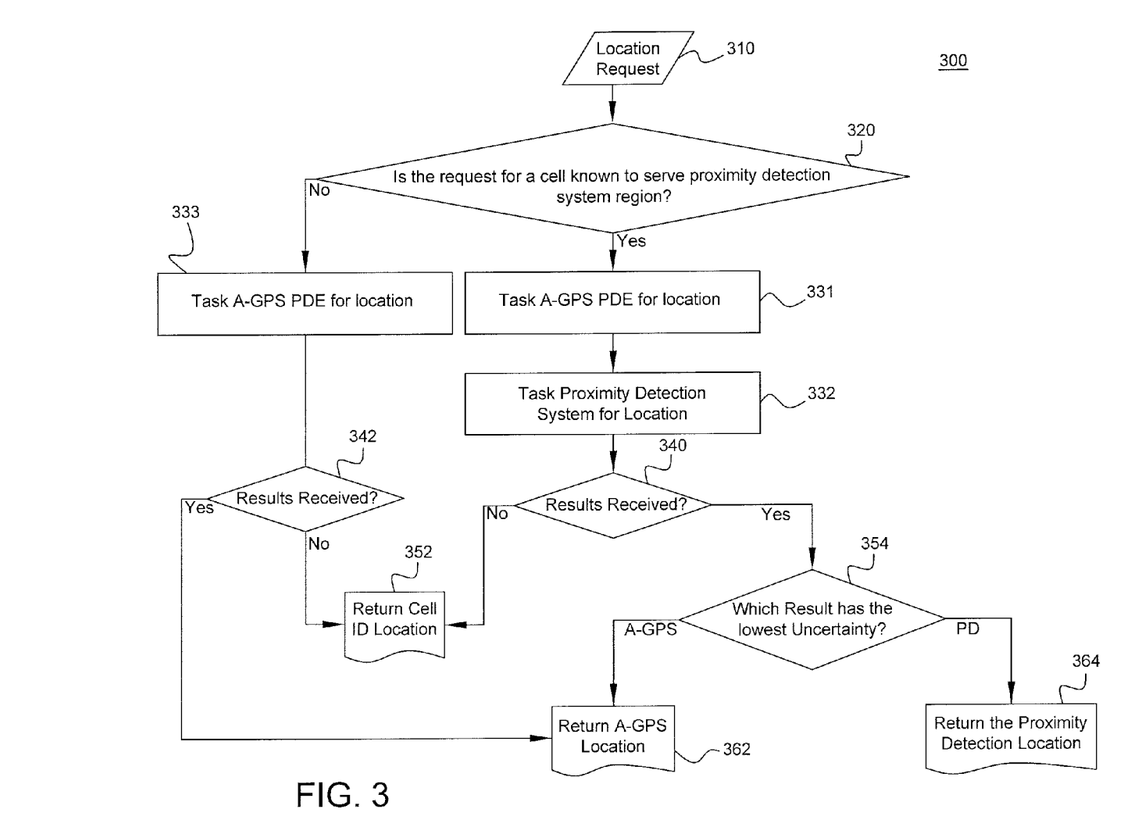
FIG. 3 is a depiction of one embodiment of the present subject matter.

FIG. 3 is a depiction of one embodiment of the present subject matter. With reference to FIG. 3, an exemplary method 300 is provided for determining a location of a mobile device operating in a wireless communications network having an A-GPS PDE. The method 300 may include receiving a location request for the mobile device at step 310. Such a request may be made by several devices or components including, but not limited to, the mobile device itself. Further, the request may be a tasking message provided by the network or by a scanning receiver located in proximity to the mobile device. At step 320, it may be determined whether the request is for a region in the network having a proximity detection system. In the event the region has a proximity detection system, then both the proximity detection system and the A-GPS PDE may be tasked at steps 331, 332 to determine a location of the mobile device. This tasking may be performed as a function of a parameter such as, but not limited to, a dialed number from the mobile device, an identification of the mobile device, an IMSI, TMSI, MIN, ESN, IMEI, class mark indicator, overhead transmission indicator, and combinations thereof. Further, the tasking of the proximity detection system may include tasking one or more proximity sensors in the proximity detection system to receive a signal transmission from the mobile device, measuring one or more signal characteristics of the signal transmission from the mobile device by each tasked proximity sensor, associating a fixed location with each tasked proximity sensor, and determining the location of the mobile device as a function of one of the associated fixed locations. The determination of location may be a function of a straight average, a weighted average, or combination of straight and weighed averages of the associated fixed locations. In yet a further embodiment, the tasking of the proximity detection system may include tasking one or more proximity sensors in the proximity detection system to receive a signal transmission from the mobile device, measuring one or more signal characteristics of the signal transmission from the mobile device by each tasked proximity sensor, and determining a location of the mobile device as a function of the measured characteristic where the measured characteristic includes range information.

If no location results are received at step 340 from either of the A-GPS PDE or the proximity detection system, then the cell-ID may be returned at step 352 as the location for the mobile device. If, however, at least one or both of the proximity detection system and the A-GPS PDE provide a location result for the mobile device, then the uncertainty of the respective location result may be determined at step 354 and the location result returned which provides the lowest uncertainty as the location for the mobile device at steps 362, 364.

If, at step 320, it is determined that the region does not have a proximity detection system, then the A-GPS PDE may be tasked at step 333 to determine a location of the mobile device. If the A-GPS PDE provides a location result at step 342 for the mobile device, then this location result may be used as the location for the mobile device at step 362. If, however, the A-GPS does not provide a location result at step 342 for the mobile device, then a cell-identification may be utilized at step 352 as the location for the mobile device. In another embodiment of the present subject matter, the method 300 may include detecting an event requiring a determination for the location of the mobile device, and transmitting a location tasking request having RF signal parameters. The detection may be performed at a physical RF layer or via a network connection.

Figure 4:
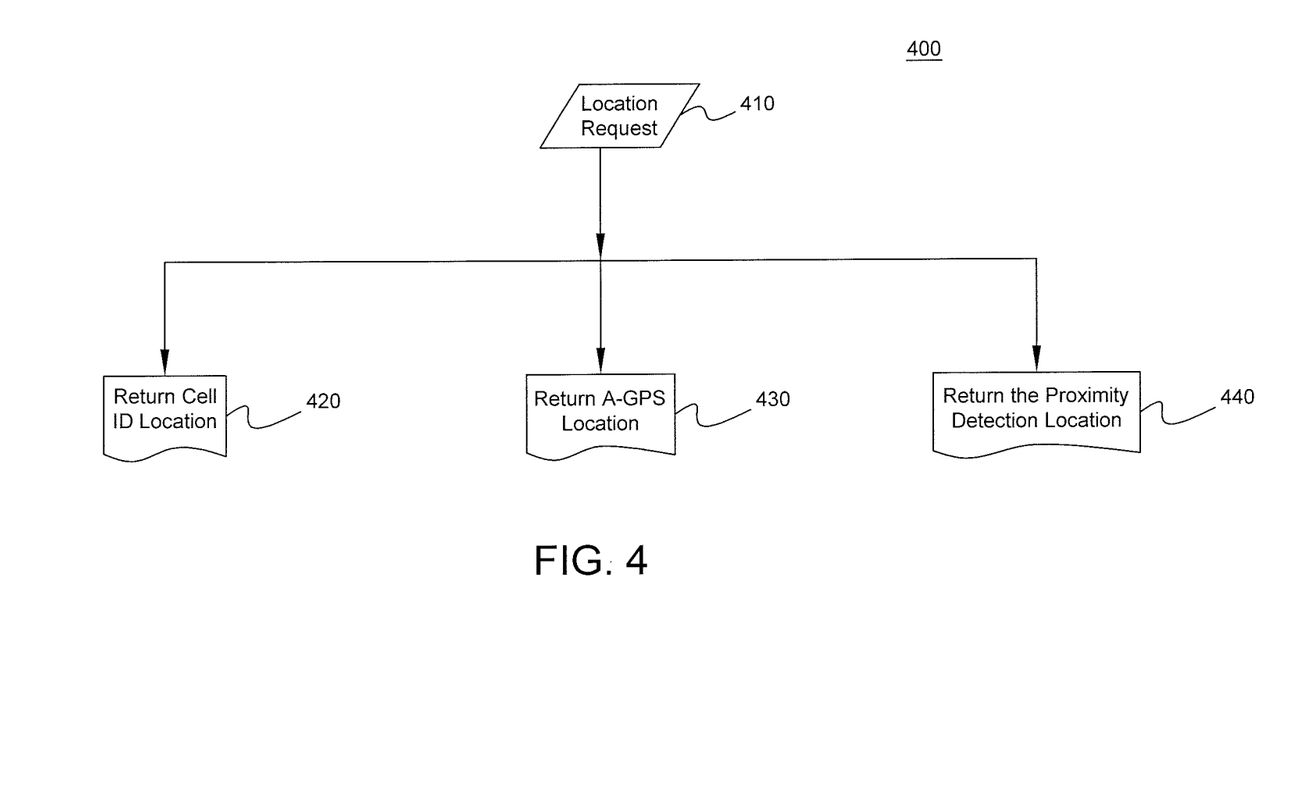
FIG. 4 is a depiction of another embodiment of the present subject matter.

FIG. 4 is a depiction of another embodiment of the present subject matter. With reference to FIG. 4, an exemplary method 400 is provided for determining a location of a mobile device operating in a wireless communications network having an A-GPS PDE. The method 400 may include at step 410 receiving a location request for the mobile device and at step 420, determining the location of the mobile device as a cell identification location if no location results are received from either the A-GPS PDE or a proximity detection system PDE. At step 430, the location of the mobile device may be determined as a location result from the A-APS PDE if the A-GPS PDE provides a location result having a lower uncertainty than a location result from the proximity detection system PDE. At step 440, the location of the mobile device may be determined as a location result from the proximity detection system PDE if the proximity detection system PDE provides a location result having a lower uncertainty than a location result from the A-GPS PDE.

Figure 5:
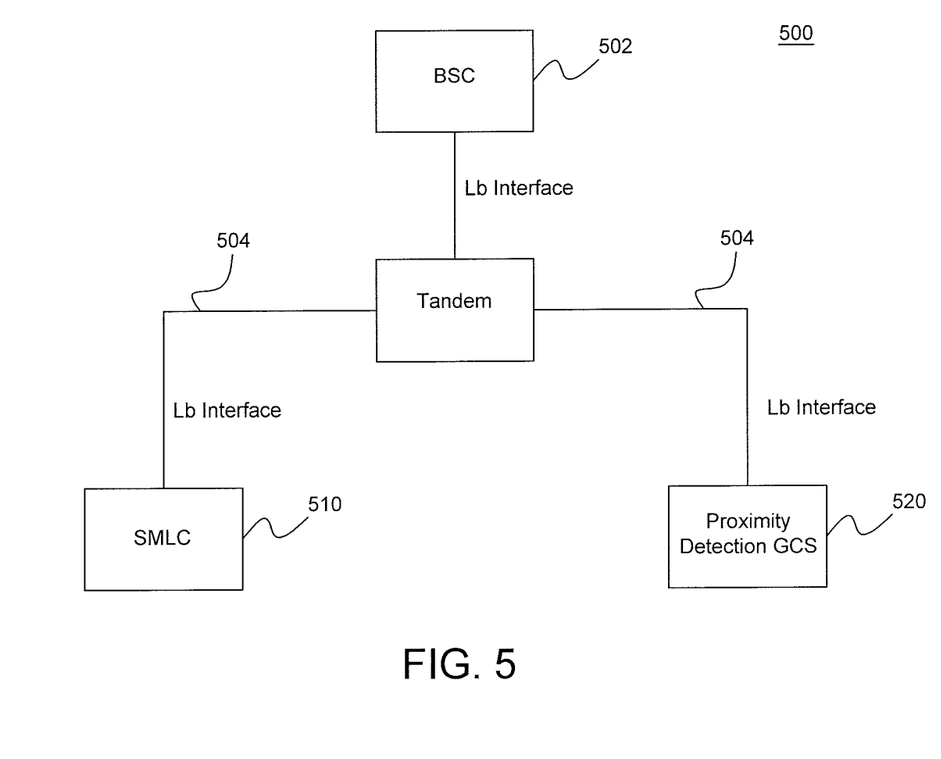
FIG. 5 is a depiction of an embodiment of the present subject matter.

In another embodiment of the present subject matter, the location system logic may not be embedded within the location center but rather as a separate function preceding the center. FIG. 5 is a depiction of such an embodiment of the present subject matter. With reference to FIG. 5, an exemplary system 500 may provide appropriate logic to recognize that a location request is for a mobile device served by a cell containing a proximity detection system according to the present subject matter. The exemplary system 500 may route a location request from a Base Station Controller 502 or other network component via appropriate interfaces 504 (e.g., Lb interface) to both a location center 510 (e.g., SMLC, e-SMLC, etc.) for non proximity detection location as well as to a proximity detection system GCS 520 in a "tandem" architecture. This tandem function or architecture may thus receive location results from both systems and may determine which location result to utilize by a quality of service logic.

Figure 6:
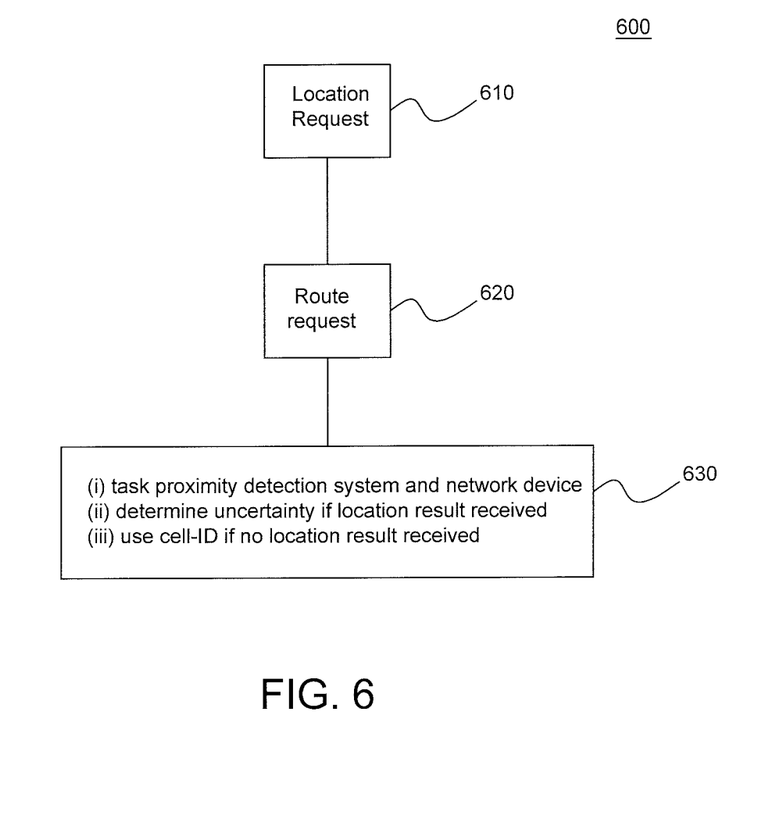
FIG. 6 is a block diagram of one embodiment of the present subject matter.

FIG. 6 is a block diagram of one embodiment of the present subject matter. With reference to FIG. 6, a method 600 for determining a location of a mobile device operating in a wireless communications network is provided. At step 610, a location request may be received for the mobile device and the request routed to a proximity detection system and a network device responsible for coordinating location information within the network (e.g., MPC, SMLC, eSMLC, SAS, etc.), at step 620. At step 630, each of steps (i)-(iii) may be performed substantially in tandem: (i) tasking both the proximity detection system and the network device to determine a location of the mobile device, (ii) if at least one of the proximity detection system and the network device provide a location result for the mobile device, then the uncertainty of the respective location result may be determined and the location result returned having the lowest uncertainty as the location for the mobile device, and (iii) if neither the proximity detection system nor the network device provide a location result for the mobile device, then a cell-identification may be used as the location for the mobile device. In another embodiment, the method may include receiving location results from each of the network device and proximity detection system, and determining which received location results to use as a function of a quality of service.

Figure 7:
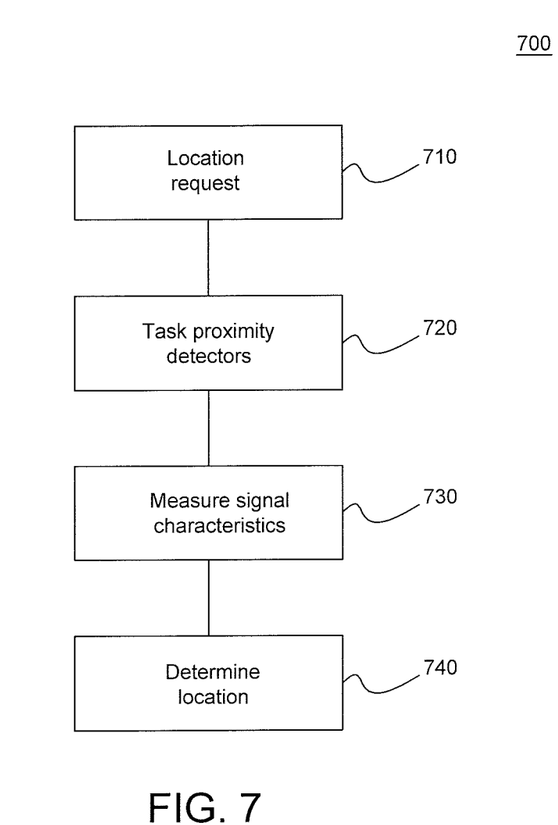
FIG. 7 is a block diagram of a further embodiment of the present subject matter.

FIG. 7 is a block diagram of a further embodiment of the present subject matter. With reference to FIG. 7, a method 700 is provided for determining the location of a mobile device in a communications network having one or more proximity sensors. At step 710 a request to locate the mobile device may be received, and at step 720, at least one of the proximity sensors may be tasked to receive a signal transmission from the mobile device. In one embodiment, the request may be provided by the mobile device. In another embodiment, the request may be a tasking message provided by the network or by a scanning receiver proximate to the mobile device. Exemplary proximity sensors may be embedded in and/or connected to a repeater in the network, in a component of a distributed antenna system of the network, or in a core component of the network, and combinations thereof. Of course, an exemplary proximity sensor may be an independent, standalone receiver apparatus.

At step 730, one or more signal characteristics of the signal transmission from the mobile device may be measured by each tasked proximity sensor. In one embodiment, this measuring may include utilizing RF signal parameters of the signal transmission from the mobile device, and determining metrics on the signal transmission from the mobile device. Exemplary RF signal parameters may be, but are not limited to, channel number, channel frequency, timeslot, network timing information, range information, spreading code, and combinations thereof. Exemplary metrics may be, but are not limited to, RSSI, SNR, Eb/Io, Ec/Io, and combinations thereof. At step 740, a location of the mobile device may be determined as a function of the measured characteristics. This determination may be accomplished by associating a fixed location with each tasked proximity sensor and then determining the location of the mobile device as a function of one of the associated fixed locations. In one embodiment, the fixed location may be a centroid of signal coverage for the proximity sensor, a most probable location determined as a function of proximity sensor surroundings, or a location determined as a function of physical boundaries around the proximity sensor limiting possible locations of the mobile device. In other embodiments, the location determination may be a function of a straight average, weighted average, or a combination of straight and weighted averages of the associated fixed locations. A further embodiment may include the step of determining a quality metric to judge an accuracy of the determined location of the mobile device. Thus, in certain embodiments of the present subject matter, the location of a mobile device may be determined without utilizing signals transmitted from base station transceivers by using proximity detection sensors deployed in the network and by determining the location of the mobile device as a function of information provided by ones of the proximity detection sensors.

Figure 8:
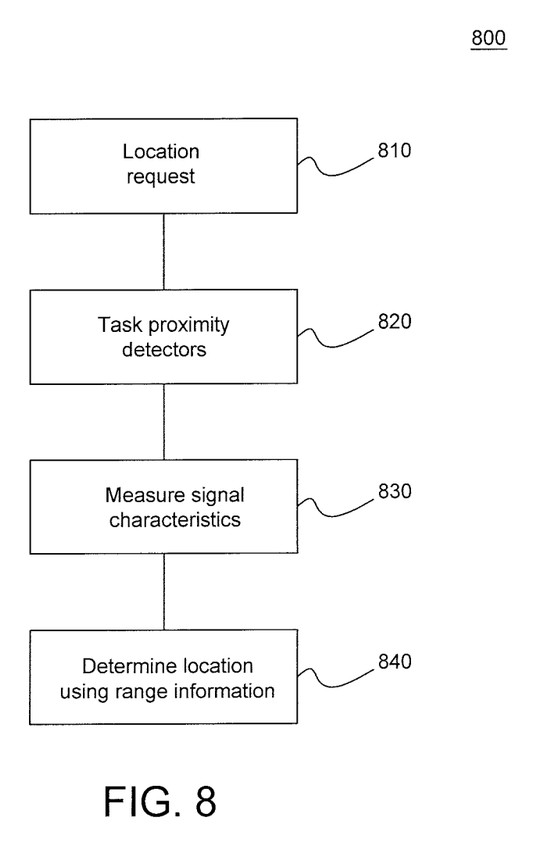
FIG. 8 is a block diagram of an additional embodiment of the present subject matter.

FIG. 8 is a block diagram of an additional embodiment of the present subject matter. With reference to FIG. 8, a method 800 is provided for determining the location of a mobile device in a communications network having one or more proximity sensors. At step 810, a request to locate the mobile device may be received, and at step 820, at least one of the proximity sensors may be tasked to receive a signal transmission from the mobile device. At step 830, one or more signal characteristics of the signal transmission from the mobile device may be measured by each tasked proximity sensor. In one embodiment, step 830 may include measuring by each tasked proximity sensor a transmit time of a signal transmitted from a base station transceiver, repeater or antenna, compensating by the proximity sensor for a receive time of the signal transmitted from the base station transceiver, repeater or antenna, compensating for transceiver processing delay of the mobile device, and determining flight time of the signal transmission from the mobile device as a function of the measured transmit time, the compensated receive time and compensated delay. In another embodiment, step 830 may include receiving transmit time information of a signal transmitted from a base station transceiver, repeater or antenna, compensating for a receive time of the signal transmitted from the base station transceiver, repeater or antenna, compensating for transceiver processing delay of the mobile device, and determining flight time of the signal transmission from the mobile device as a function of the received transmit time information, the compensated receive time and compensated delay. At step 840, a location of the mobile device may be determined as a function of the measured characteristics where the measured characteristic includes range information.

Figure 9:
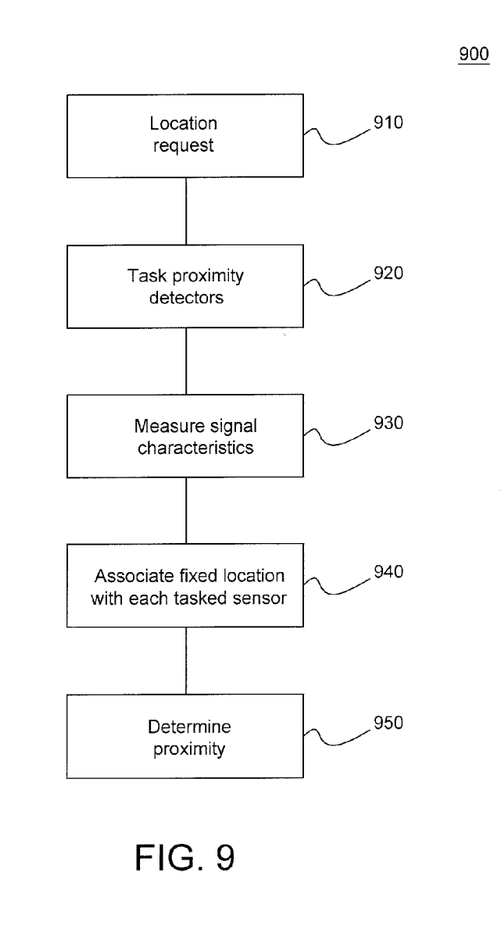
FIG. 9 is a block diagram of another embodiment of the present subject matter.

FIG. 9 is a block diagram of another embodiment of the present subject matter. With reference to FIG. 9, a method 900 is provided for determining if a mobile device is operating in a predetermined region of a communications network. At step 910, a request to locate the mobile device may be received, and at step 920, at least one or more proximity sensors in the network may be tasked to receive a signal transmission from the mobile device. At step 930, one or more signal characteristics of the signal transmission from the mobile device may be measured by the tasked proximity sensor. At step 940, a fixed location may be associated with each tasked proximity sensor, and at step 950, the proximity of the mobile device in the predetermined region may be determined using the associated fixed locations.

As shown by the various configurations and embodiments illustrated in FIGS. 1-9, a system and method for mobile location by proximity detection have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of determining the location of a mobile device in a communications network having one or more base station transceivers and one or more proximity sensors, wherein the one or more proximity sensors are not co-located with any one of the one or more base station transceivers; the method comprising the steps of:
   (a) receiving a request to locate the mobile device;
   (b) tasking, using a geolocation control system ("GCS"), at least one of the proximity sensors to receive a signal transmission from the mobile device;
   (c) transmitting a first signal from at least one of the one or more base station transceivers to the mobile device;
   (d) transmitting by the mobile device the signal transmission from the mobile device, in response to receiving the first signal;
   (e) measuring one or more signal characteristics of the signal transmission from the mobile device by each tasked proximity sensor; wherein the signal transmission from which said signal characteristics are measured by each tasked proximity sensor is not received by said each tasked proximity sensor via the one or more base station transceivers;
   (f) collecting at said GCS the measured characteristics; and
   (g) determining at said GCS a location of the mobile device as a function of the measured characteristic, wherein the measured characteristic includes range information;
   wherein the step of measuring further comprises:
   (i) measuring by each tasked proximity sensor a transmit time of the first signal, a transmit time of a second signal transmitted by a repeater, or a transmit time of a third signal transmitted by a Distributed Antenna System ("DAS") antenna, wherein the second and third signal are each a repeated version of the first signal,
   (ii) measuring by the proximity sensor for a receive time of the first, second, or third signal,
   (iii) for estimating transceiver processing delay of the mobile device, and
   (iv) determining flight time of the signal transmission from the mobile device as a function of the measured transmit time, the measured receive time and the estimated delay.

2. The method of claim 1 wherein the request to locate the mobile device is provided by the mobile device.

3. The method of claim 1 wherein the request to locate the mobile device is a tasking message provided by the network or by a scanning receiver in a region of coverage of the mobile device.

4. The method of claim 1 wherein at least one of the one or more proximity sensors is embedded in a repeater in the network, in a component of a distributed antenna system of the network, in a core component of the network, or combinations thereof.

5. The method of claim 1 wherein at least one of the one or more proximity sensors is connected to a repeater in the network, to a component of a distributed antenna system of the network, to a core component of the network, or combinations thereof.

6. The method of claim 1 wherein at least one of the one or more proximity sensors is an independent, standalone receiver apparatus.

7. The method of claim 1 wherein the step of measuring one or more signal characteristics of the signal transmission from the mobile device further comprises:
   (i) utilizing a radio frequency (RF) signal parameter of the signal transmission from the mobile device, and
   (ii) determining metrics on the signal transmission from the mobile device.

8. The method of claim 7 wherein the RF signal parameter is selected from the group consisting of channel number, channel frequency, timeslot, network timing information, range information, spreading code, and combinations thereof.

9. The method of claim 7 wherein the metric is selected from the group consisting of received signal strength indication, signal to noise ratio, ratio of energy per bit over power spectral density of noise and interference (Eb/Io), ratio of received pilot energy over power spectral density of noise and interference (Ec/Io), and combinations thereof.

10. The method of claim 1 wherein the signal transmission is a communication between the mobile device and the one or more base station transceiver.

11. A method of determining the location of a mobile device in a communications network having one or more base station transceivers and one or more proximity sensors, wherein the one or more proximity sensors are not co-located with any one of the one or more base station transceivers; the method comprising the steps of:

(a) receiving a request to locate the mobile device;
(b) tasking, using a geolocation control system ("GCS"), at least one of the proximity sensors to receive a signal transmission from the mobile device;
(c) transmitting a first signal from at least one of the one or more base station transceivers to the mobile device;
(d) transmitting by the mobile device the signal transmission from the mobile device, in response to receiving the first signal;
(e) measuring one or more signal characteristics of the signal transmission from the mobile device by each tasked proximity sensor; wherein the signal transmission from which said signal characteristics are measured by each tasked proximity sensor is not received by said each tasked proximity sensor via the one or more base station transceivers; and
(f) collecting at said GCS the measured characteristics; and
(g) determining at said GCS a location of the mobile device as a function of the measured characteristic,
wherein the measured characteristic includes range information;
wherein the step of measuring further comprises:
(i) receiving transmit time information of transmit time of the first signal, a transmit time of a second signal transmitted by a repeater, or a transmit time of a third signal transmitted by a Distributed Antenna System ("DAS") antenna, wherein the second and third signal are each a repeated version of the first signal,
(ii) measuring for a receive time of the signal transmitted from the base station transceiver, repeater or antenna,
(iii) estimating for transceiver processing delay of the mobile device, and
(iv) determining flight time of the signal transmission from the mobile device as a function of the received transmit time information, the measured receive time and the estimated delay.

12. The method of claim 11 wherein the request to locate the mobile device is provided by the mobile device.

13. The method of claim 11 wherein the request to locate the mobile device is a tasking message provided by the network or by a scanning receiver in a region of coverage of the mobile device.

14. The method of claim 11 wherein at least one of the one or more proximity sensors is embedded in a repeater in the network, in a component of a distributed antenna system of the network, in a core component of the network, or combinations thereof.

15. The method of claim 11 wherein at least one of the one or more proximity sensors is connected to a repeater in the network, to a component of a distributed antenna system of the network, to a core component of the network, or combinations thereof.

16. The method of claim 11 wherein at least one of the one or more proximity sensors is an independent, standalone receiver apparatus.

17. The method of claim 11 wherein the step of measuring one or more signal characteristics of the signal transmission from the mobile device further comprises:
(i) utilizing a radio frequency (RF) signal parameter of the signal transmission from the mobile device, and
(ii) determining metrics on the signal transmission from the mobile device.

18. The method of claim 17 wherein the RF signal parameter is selected from the group consisting of channel number, channel frequency, timeslot, network timing information, range information, spreading code, and combinations thereof.

19. The method of claim 17 wherein the metric is selected from the group consisting of received signal strength indication, signal to noise ratio, ratio of energy per bit over power spectral density of noise and interference (Eb/Io), ratio of received pilot energy over power spectral density of noise and interference (Ec/Io), and combinations thereof.

20. The method of claim 11 wherein the signal transmission is a communication between the mobile device and the one or more base station transceiver.

\* \* \* \* \*